(No Model.)
W. H. AVIS.
GROOVED PULLEY.
No. 405,651. Patented June 18, 1889.
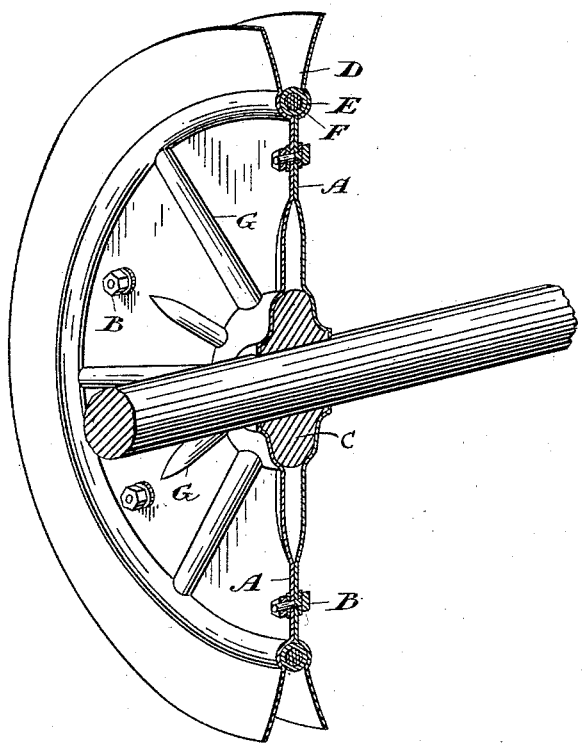
Witnesses.
J. Edw. Maybee
Chas. H. Riches,
Inventor.
W. H. Avis
by
Donald C. Ridout & Co.
attys.

United States Patent Office.

WALTER H. AVIS, OF YORK, ONTARIO, CANADA.

GROOVED PULLEY.

SPECIFICATION forming part of Letters Patent No. 405,651, dated June 18, 1889.

Application filed May 21, 1888. Renewed April 5, 1889. Serial No. 306,146. (No model.)

*To all whom it may concern:*

Be it known that I, WALTER HERBERT AVIS, manufacturer, of the township of York, in the county of York, in the Province of Ontario, Canada, have invented certain new and useful Improvements in Grooved Pulleys, of which the following is a specification.

The object of the invention is to design a grooved pulley for the transmission of power by rope, which will grip the rope with the least possible strain on its tensile strength; and it consists in the peculiar combinations and the construction, arrangement, and adaptation of parts, all as more fully hereinafter described and claimed.

The drawing shows a perspective cross-sectional view of my improved pulley.

I illustrate a special style of pulley, which I purpose making of sheet-steel, in order that I may secure a strong and durable pulley, which will be exceedingly light in proportion to its strength. This pulley I form of two light steel sheets A, shaped any suitable form and secured together by the bolts B. The hub C, I preferably form of cast metal, having the steel sheets A shaped to fit the hub, as indicated. The outer portion of each sheet is flared to form the groove D, to receive the driving-rope. An annular recess is formed at the bottom of this groove D, into which recess I insert a rubber ring E, which I preferably make tubular, and insert in the tube a ring of rope F or other slightly-compressible material. Each sheet A has a series of ribs G rolled on its surface, so as to strengthen the body of the pulley. When the driving-rope is placed in the groove D, its main strain will be supported by the steel sides of the said groove; but the bottom of the driving-rope will be in contact with the rubber ring E, and a frictional connection between the two sufficient to prevent the driving-rope slipping will be formed. If it were not for the introduction of the rubber ring E, it would be necessary to apply a great tensile strain on the driving-rope in order to secure an equally as good connection between the rope and pulley. It therefore follows that by the adoption of my rubber ring or cushion all strain on the shaft carrying the pulleys is practically avoided, as the weight of the driving-rope will be quite sufficient to form the desired grip, and therefore the rope may be very slack without slipping.

What I claim as my invention is—

1. A pulley composed of a suitable hub and two metal sheets formed with a peripheral groove, combined with a rubber ring seated in a recess at the bottom of said groove and a core of compressible material in said ring, substantially as described.

2. A pulley provided with a groove formed of two sheets of metal flaring in opposite directions and having a recess in the bottom of the groove and a core of compressible material in said recess, substantially as described.

Toronto, April 14, 1888.

WALTER H. AVIS.

In presence of—
    MATT WARNOCK,
    CHARLES C. BALDWIN.